Patented May 3, 1949

2,469,317

UNITED STATES PATENT OFFICE 2,469,317

INSECTICIDAL AND FUNGICIDAL COMPOSITION

Edward C. Shokal, Oakland, and Lynwood N. Whitehill, Berkeley, Calif., assignors to Shell Development Company, San Francisco, Calif., a corporation of Delaware No Drawing. Application August 26, 1944, Serial No. 551,423

11 Claims. (Cl. 167—24)

This invention relates to new and novel compounds which are particularly suitable for killing noxious insects and the like. More specifically, the invention is concerned with insecticidal compositions containing esters of ether dicarboxylic acids.

Among the best known toxicants used in insecticidal compositions, particularly in household insecticides, are pyrethrum and rotenone. These are both derived from plants grown in foreign countries and are therefore expensive and not always obtainable in desired quantities. Thus, many organic compounds which are more readily available in this country have been proposed as toxicants for insecticidal compositions. However, although many of these proposed compounds are relatively efficient for momentarily incapacitating insects, they are relatively inefficient for killing insects. In addition to the desirability of high toxic action, for use in insecticides, particularly in household insecticides, the compounds must be light-stable, compatible with light paraffinic mineral oils, such as kerosene, and free from injurious effect and offensive odor to human beings and tendency to stain walls, fabrics, etc.

It is an object of the present invention to provide an insecticidal composition which is highly toxic to insects but of low toxicity to man and other warm-blooded animals. Another object is to provide new insecticidal compositions which can be prepared from readily available domestic and inexpensive materials. A further object is to provide an improved insecticidal composition containing a fast-acting synethetic toxicant which is stable toward light. A further object of this invention is to provide an activator for toxic plant extracts, such as pyrethrum and derris resin or rotenone, in insecticidal compositions.

We have found that esters of the lower molecular weight ether dicarboxylic acids are particularly effective and highly active insecticidal agents. The present compounds include the saturated and unsaturated aliphatic and alicyclic, aromatic and heterocyclic diesters of oxy-, thio-, and imino- ether dicarboxylic acids. These may be represented by the general formula:

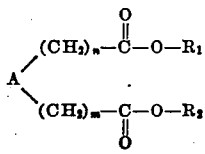

wherein A represents O, S, or N atoms, the third bond of the nitrogen atom being satisfied with a hydrogen atom or lower alkyl group, $n$ and $m$ may be like or unlike integers, preferably less than 6, and $R_1$ and $R_2$ may be like or unlike alkyl, alkenyl, aralkyl, aryl, alicyclic, cyclo-olefinic or heterocyclic radicals, such as, for example, methyl, ethyl, propyl, isopropyl, normal butyl, secondary butyl, tertiary butyl, hexyl, iso-octyl, dodecyl, cetyl, stearyl, trimethyl, octadecyl, allyl, methallyl, crotyl, methyl vinyl carbinyl, butenyl, pentenyl, hexenyl, propargyl, geranyl, oleyl, cyclopentyl, ethyl cyclopentyls, methallyl cyclopentyls, methyl butyl cyclopentyls, cyclohexyl, allyl cyclohexyls, diallylcyclohexyls, isopropyl cyclohexyls, secondary butyl cyclohexyls, dimethyl cyclohexyls, trimethyl cyclohexyls, endomethylene cyclohexyls, cyclopentenyl, methyl cvyclopentenyls, amyl cyclopentenyls, cyclohexenyl, dimethyl cyclohexenyls, trimethyl cyclohexenyls, allyl cyclohexenyls, vinyl cyclohexenyls, phenyl, metallyl phenyl, tolyl, xylyl, vinyl phenyl, butyl phenyls, 4-isobutyl phenyl, naphthyl, methyl naphthyl, crotonyl naphthyl, triallyl naphthyl, anthryl, etc., or heterocyclic radicals, such as pyridyl, sulfolanyl, methyl sulfolanyl, pyrrolyl, thioenyl, furyl, butyl carbothionyl, octyl carbothionyl, etc. In general, there may be included in the rings or chains, for example, such additional atoms or groups as

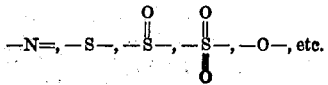

Also, esters of ether dicarboxylic acids may be used, which also have in the molecule one or more of the following groups; sulfo, amino, hydroxy carboxy, amido, mercapto, keto, ether, ester, lactone, lactam, ketal, acetal, halogen, halohydrin, epoxide, cyanohydrin, azo, diazo, thiazo, oxazo, thioether, thioimino, cyano, thiocyano, etc.

The preferred compounds of the present class of compounds are the esters, especially the lower molecular weight diesters, of diglycollic acid. In some applications the dialkenyl, e. g. dially esters of diglycollic acid are most desirable.

The present esters of ether dicarboxylic acids may be prepared in any suitable manner, such as by esterification of an ether diacid, for example, diglycolllic acid, with a suitable alcohol, such as allyl alcohol.

The esters of ether dicarboxylic acids, either alone or in combination with other active or inactive substances, may be applied to plants, animals, fabrics and the like, by spraying, dusting, pouring, dipping, etc., in the form of concentrated liquids, solutions, suspensions, dusting powders, and the like, containing such concentration of the active principle as is most suited for the particular purpose at hand. They may be applied, for example, in the form of dilute solutions, in a suitable solvent or mixture of solvents, containing, for instance, petroleum distillate, lignite tar oils, paraffin oils, naphthenes, chlorinated hydrocarbons, such as dichloropropane, chlorinated ethers, ketones, such as acetone, fenchyl and bornyl alcohols, mono- and polyhydric alcohols, glycol ethers, or the like or mixtures thereof.

The present compounds may be advantageously used in combination with other insecticides or fungicides such as pyrethrum, derris resins, rotenone, nicotine, lime-sulphur, Bordeaux mixture, copper sulfate, copper carbonates, sulphur, mercury compounds, sodium, calcium and lead arsenates, iron sulfate, phenol, paradichlorobenzene, unsaturated chlorides, higher unsaturated amides, alkene sulfides, alkyl dithiocarbamates, thiuram sulfides, thiocyanates, thiocyano esters, isothiocyanates, ethylene glycol ether of pinene, butyl mesityl oxide oxalate, polyhalogenated compounds, such as 1,1-diparachlorophenyl, 2,2,2-trichloroethane, unsaturated cyclic ketols, such as diisophorone and its homologues, obtained by condensation of lower ketones, such as acetone, methyl ethyl ketone, etc., according to U. S. Patent 2,307,482, and the like.

As will be readily apparent, the most desirable ester of an ether dicarboxylic acid and solvent, or solvent mixture, or combination with other active and inactive ingredients, will depend considerably upon the particular use for which the material is intended.

For use in household insecticides, esters of ether dicarboxylic acids are preferably dissolved in a light hydrocarbon oil such as highly refined, odorless kerosene or kerosene distillate with or without the addition of other insecticides and sprays. Ordinarily from about 1% to 25% and preferably from 2% to 8% of the present toxicants are used in such sprays.

When solutions of the esters of ether dicarboxylic acids in odorless base kerosene are placed on filter paper and exposed to air, the liquid evaporates, leaving substantially no stain behind, which feature is of particular advantage in household insecticides.

For use in sprays, such as horticultural spray oils, there may be added emulsifying agents, such as partial esters of polyhydric alcohols, e. g. glycerol mono-oleate, polyethylene glycol mono laurate, palmitate, stearate, oleate, etc., various soaps, alkali metal salts of sulfuric acid mono esters and organic sulfuric acids and the like.

The present compounds may also be mixed with or absorbed by finely divided solid materials, such as wood flour, talc, clay, bentonite, sulphur, and carbon black, and used as dusting insecticides.

The present esters of ether dicarboxylic acids may be used to solutize rotenone, derris resins, and other difficultly soluble plant extracts in the desired carrier, such as highly refined mineral oil. These agents, either cold or hot or in combination with mineral oils or other extractants, may also be used to extract the active ingredients from plant materials, such as rotenone from derris root, pyrethrum extract from pyrethrum flowers, etc. Any suitable or well-known extracting, contacting and separating steps and apparatus may be used.

Modified Peet-Grady tests were made with the esters of ether dicarboxylic acids of the present invention. The general test is fully described in the 1940 "Blue Book," published by the publisher of "Soap and Sanitary Chemicals" periodical on pages 193 to 197, as the large group method. Briefly, the test as practiced consists of releasing 100 to 150 flies in an air-conditioned case 6 x 6 x 6 feet and spraying them with 6 ml. of insecticide. After 10 minutes exposure the number of flies which are incapacitated or "knocked down" is noted and all flies transferred to a cage and allowed to recuperate in fresh air for 24 hours, when the dead flies are counted. For the purpose of this study the percentages knocked down at 10 minutes and killed at 24 hours were recorded. The results obtained by testing in the above manner diallyl diglycollate in highly refined, odorless kerosene with added pyrethrum and, for comparison as a standard, pyrethrum alone in said kerosene, are given in the following table:

| Test No. | Agent | Vol. of Agent | Vol. of Pyrethrum Extract | Percent 10 min. knock down | Percent 24 hour kill |
|---|---|---|---|---|---|
| 1 | Diallyl diglycollate | Percent 5 | Percent 5 | 90 | 85 |
| 2 | None | | 5 | | 38 |

Besides the control of houseflies (*Musca domestica*), the compositions containing the present esters of ether diacids may be used for eradicating or controlling various pests, such as insects, e. g., aphids, diabrotica, red spiders, thrips, etc., bacteria and fungi, such as *Aspergillus, Penicillium, Sclerotium rolfsii*, etc., and the like.

We claim as our invention:

1. An insecticidal and fungicidal composition comprising a normally liquid hydrocarbon having its boiling range substantially above the boiling range of gasoline, said hydrocarbon being a mineral hydrocarbon spray oil and a dialkenyl diester of a lower molecular weight ether dicarboxylic acid represented by the formula

R₁OOC—(CH₂)ₙ—A—(CH₂)ₘ—COOR₂ wherein A is a member selected from the group consisting of oxygen and sulfur atoms, wherein $n$ and $m$ are integers less than 6 and R₁ and R₂ are alkenyl radicals, each of which has from 2 to 10 carbons atoms, inclusive.

2. An insecticidal composition comprising a normal liquid hydrocarbon having its boiling range substantially above the boiling range of gasoline, said hydrocarbon being a mineral hydrocarbon spray oil and a dialkenyl diester of a lower molecular weight oxy-ether dicarboxylic acid represented by the formula

R₁OOC.(CH₂)ₙO(CH₂)ₘ.COOR₂ wherein $n$ and $m$ are integers less than 6 and R₁ and R₂ are alkenyl hydrocarbons radicals each of which has from 2 to 10 carbon atoms, inclusive.

3. An insecticidal composition suitable for use as a household insecticide comprising a light hydrocarbon oil having its boiling range substantially above the boiling range of gasoline, said hydrocarbon being a mineral hydrocarbon spray oil and a dialkenyl-hydrocarbon diester of diglycollic acid wherein each of the dialkenyl-hydrocarbon radicals has from 2 to 10 carbon atoms, inclusive.

4. An insecticidal and fungicidal composition suitable for use in a household, comprising a normally liquid hydrocarbon having its boiling range substantially above tthe boiling range of gasoline, said hydrocarbon being a mineral hydrocarbon spray oil, and a dialkenyl diester of diglycollic acid wherein the alkenyl radicals each have from 3 to 4 carbon atoms, inclusive, and are selected from the group consisting of allyl and methallyl radicals.

5. An insecticidal composition suitable for use as a household insecticide comprising a normally liquid hydrocarbon having its boiling range substantially above the boiling range of gasoline, said hydrocarbon being a mineral hydrocarbon spray oil and diallyl diglycollate.

6. An insecticidal composition suitable for use as a household insecticide comprising a kerosene distillate, diallyl diglycollate and pyrethrum.

7. An insecticidal and fungicidal composition comprising a normally liquid hydrocarbon having its boiling range substantially above the boiling range of gasoline, said hydrocarbon being a mineral hydrocarbon spray oil, and a dialkenyl diester of diglycollic acid wherein the alkenyl radicals each have from 3 to 4 carbon atoms, inclusive, and are selected from the group consisting of allyl and methallyl radicals, and pyrethrum extract.

8. An insecticidal and fungicidal composition comprising a normally liquid hydrocarbon having its boiling range substantially above the boiling range of gasoline, said hydrocarbon being a mineral hydrocarbon spray oil, pyrethrum extract and a dialkenyl diester of a lower molecular weight oxy-ether discarboxylic acid represented by the formula $$R_1OOC-(CH_2)_n-O-(CH_2)_m-COOR_2$$

wherein O represents an oxygen atom, wherein $n$ and $m$ are integers less than 6 and $R_1$ and $R_2$ are alkenyl radicals, each of which has from 2 to 10 carbon atoms, inclusive.

9. The process of extracting pyrethrum as a pyrethrum extract from pyrethrum plant material comprising contacting said plant material with a normally liquid hydrocarbon having a boiling range substantially above the boiling range of gasoline, said hydrocarbon being a mineral hydrocarbon spray oil, and said hydrocarbon containing diallyl diglycollate.

10. An insecticidal and fungicidal composition comprising a kerosene distillate having its boiling range substantially above the boiling range of gasoline, and diallyl diglycollate.

11. An insecticidal and fungicidal composition comprising a kerosene distillate having its boiling range substantially above the boiling range of gasoline, and a diallylic diester represented by the formula $ROOC(CH_2)-A-(CH_2)-COOR$, wherein A is a member selected from the group consisting of oxygen and sulfur atoms, and wherein each R represents an allyl radical.

EDWARD C. SHOKAL.
LYNWOOD N. WHITEHILL.

REFERENCES CITED

The following references are of record in the file of this patent:

UNITED STATES PATENTS

| Number | Name | Date |
|---|---|---|
| 2,027,991 | Lubbert et al. | Jan. 14, 1936 |
| 2,217,673 | Coleman | Oct. 15, 1940 |
| 2,268,206 | Epstein et al. | Dec. 30, 1941 |
| 2,379,251 | Muskat | June 26, 1945 |
| 2,386,999 | Adelson et al. | Oct. 16, 1945 |

OTHER REFERENCES

Chemical Abstracts, 1941, page 4765, by Backer et al.